United States Patent [19]

Speth et al.

[11] 4,052,642
[45] Oct. 4, 1977

[54] APPARATUS FOR CONTROLLING CONTROLLED SYSTEMS WITH DEAD TIME

[75] Inventors: Winfried Speth, Ulm; Walter Dreiseitl; Klaus Böhm, both of Erlangen; Lothar Schleicher, Erlangen; Herbert Polster, Spardorf, all of Germany

[73] Assignee: Siemens Aktiengesellschaft, Munich, Germany

[21] Appl. No.: 665,873

[22] Filed: Mar. 11, 1976

[30] Foreign Application Priority Data

Mar. 12, 1975 Germany .............................. 2510837

[51] Int. Cl.$^2$ ............................................. G05B 13/00
[52] U.S. Cl. .................................. 318/561; 318/632; 364/118
[58] Field of Search .............................. 318/632, 561; 235/150.1, 151.11

[56] References Cited

U.S. PATENT DOCUMENTS

| 3,790,764 | 2/1974 | Rouxel et al. | 318/621 X |
| 3,793,576 | 2/1974 | Masuzawa et al. | 318/621 |
| 3,979,653 | 9/1976 | Cutler | 318/621 |

Primary Examiner—B. Dobeck
Attorney, Agent, or Firm—Kenyon & Kenyon, Reilly, Carr & Chapin

[57] ABSTRACT

In controlled systems with dead time, particularly converter current controls, the reference value is fed directly to the final control element providing anticipatory control and, in addition is fed to the reference input of the controller through a dead time simulator. In accordance with a further feature, the difference between the input signal and the output signal of the dead time simulator can be added into the final control element as an additional control variable to compensate for inertia of the controlled system.

7 Claims, 5 Drawing Figures

APPARATUS FOR CONTROLLING CONTROLLED SYSTEMS WITH DEAD TIME

BACKGROUND OF THE INVENTION

This invention relates to controlled systems in general and more particularly to improved apparatus for controlling controlled systems with dead time employing a controller with integral characteristic.

Apparatus of this general nature is described in the journal "Technische Mitteilungen AEG-Telefunken" 59 (1969), pages 348 to 352. In the disclosed system a converter control element is influenced exclusively by the output signal of a current controller. Therefore the time behavior of the current controller is a decisive factor in the determination of the time between a change in the reference value and a corresponding change at the output of the controlled system. With this prior art apparatus response times which are about six times the mean statistical dead time of the converter are obtained.

Thus, the need to reduce the response time in apparatus of this type and to make the control behavior of the controlled system independent of the stability limit of the controlled system is evident.

SUMMARY OF THE INVENTION

According to the present invention, this problem is solved by feeding the reference value to the controller through a dead time member having a dead time which corresponds approximately to the dead time of the controlled system, and by further having it influence the input signal for the final control element. In this manner, the controller is still only used for compensating interference signals (noise) and its design, made in view of obtaining optimal control, has only a correcting effect on the control behavior. This allows the system to have a response time which is the theoretical shortest possible value.

DETAILED DESCRIPTION OF THE PREFERRED EMBODIMENT

Figure 1:
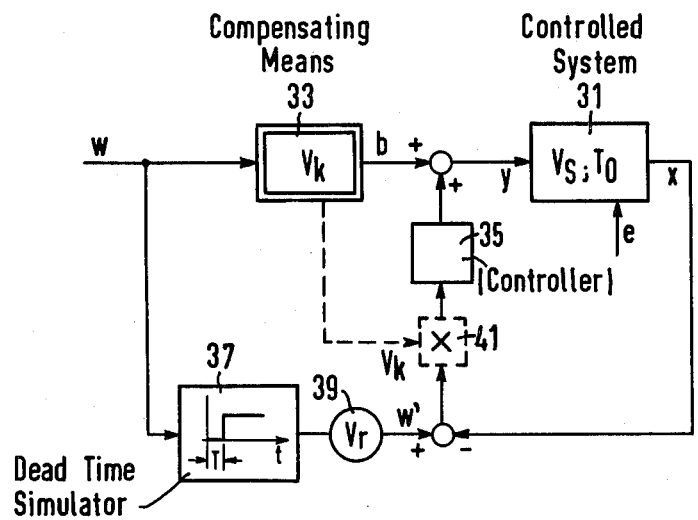
FIG. 1 is a block diagram illustrating the basic elements of the system of the present invention.

In the basic block diagram of FIG. 1, the controlled system 31 is assumed to also include the final control element, not shown, and to have, overall, the gain $V_S$ and the dead time $T_o$. The general relation $V_s = dx/dy$ holds between the input variable $y$ of the controlled system 31 and its output variable $x$. Where there is a nonlinear relation between $x$ and $y$ expressed as $x = f_s(y)$, the overall gain of the system, $V_s = dx/dx = f'_s(y)$, becomes dependent on the operating point. This will be assumed in the following discussion.

The control signal $y$ for the controlled system is composed of two components: The one consists of the output signal $b$ of a compensating means 33 having as an input the reference signal $w$. The purpose of this compensation means 33 is to compensate controlled system gain $V_s$ as the operating point changes. Therefore it also has the proportional gain $V_k$ dependent on the operating point which is chosen so that the product $V_k \cdot V_s$ is a selectable, constant value $V_r$ for any operating point. Thus, the functional relationship between the input variable $w$ of the compensating means and its output variable $b$, i.e., the characteristic which it must produce, is obtained from the relation $w = (1/V_r) \cdot f_s(b)$ and the proportional gain $V_k$ then becomes $V_k = db/dw = V_r/f'_s(b)$.

Compensating means of this nature can be implemented using convention function generators which comprise, for instance, operational amplifiers, having threshold diodes biased with different voltages arranged in their feedback or input circuits.

The second component of the control signal $y$ consists of the output signal of a controller 35, which has at its input a function of the difference between the reference signal $w$, after it passes through a dead time simulator 37 and is amplified in a proportional member 39 with a gain $V_r$, and the actual value $x$ of the control variable. The dead time T of the dead time simulator 37 corresponds approximately to the dead time of the controlled system 31; its gain is 1. Upon a sudden change of its input signal, its output signal, at the end of the dead time, therefore has the same value as its input signal. A dead time simulator can be implemented in a well known manner either by means of an L-C chain have a sufficient number of sections or by means of an allpass network, i.e. what is known as a Pade approximation. In order to also ensure constant gain in the control loop containing the controller of the control circuit and to thereby provide for a controller which is optimally adapted for all operating points, it is advantageous to arrange modulation means 41 e.g., in the form of a multiplier, in the input circuit of the controller 35 and to modulate the input signal of the controller 35 with the gain factor $V_k$ of the compensating means. In this manner, the controller 33 always operates in a control loop with constant gain $V_r = V_k \cdot V_s$.

With the arrangement shown in FIG. 1, the following mode of operation results:

The compensating means 33 compensates the static transmission behavior of the controlled system, so that the controlled variable $x$ follows a reference value command or a reference value change in the shortest possible time, which time is determined by the dead time $T_o$ of the controlled system 31. In contrast to conventional control systems, in which the reference signal must first go through a controller before it can become effective at the control input of the controlled system, considerably shortened response times are obtained with the arrangement according to the present invention. The controller 35 is used only for compensating control deviations which are due to noise $\epsilon$ acting on the controlled system 31. As long as the noise $\epsilon$ does not change, the output signal of the dead time simulator agrees with the controlled variable. If the noise changes, the controlled variable $x$ deviates at first from the output signal $w'$ of the proportional member 39, but this is compensated by the controller 35. Thus, if the signal $w'$ changes, nothing is changed in the input signal of the modulation means 41, since a change of the reference value signal w appears at both the output of the proportional member 39 and at the output of the controlled system 31 with the same magnitude and delayed by the same time. Thus, after the reference value signal w is changed, unnecessary control commands which would then have to be nulled after the dead time $T_o$ has passed need not be given. The arrangement according to the present invention is therefore extremely low in oscillations and permits the servo behavior of the system to become independent of the stability limit of the control circuit and, therefore, independent of the optimization of the controller.

Figure 2:
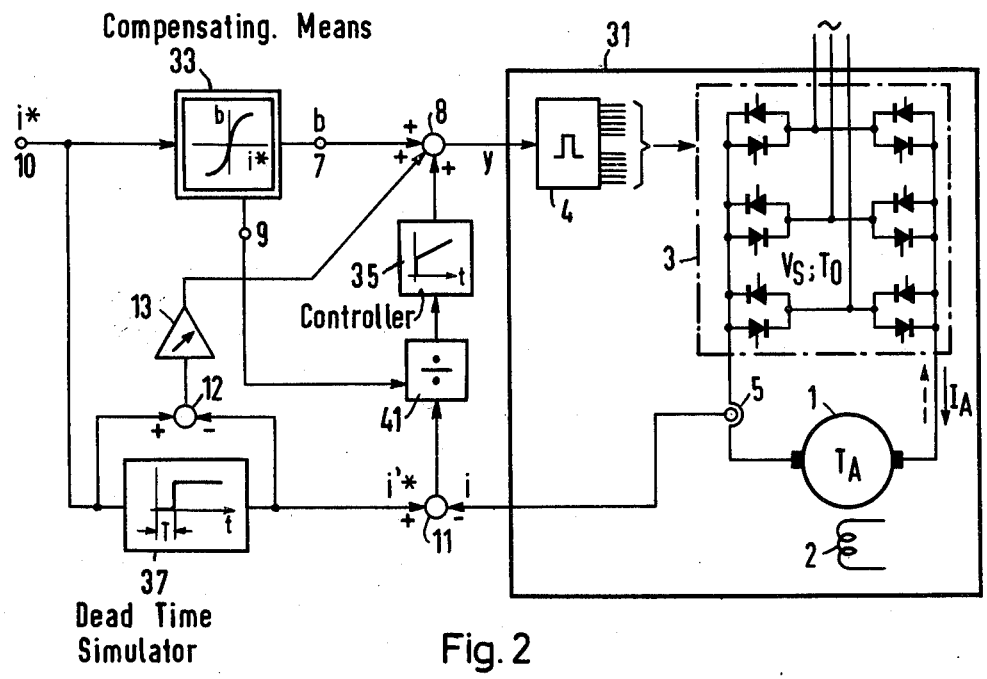
FIG. 2 is a more detailed block-circuit diagram illustrating the application of the system of the present invention to the control of a d-c motor supplied by a line commutated converter.
Figure 3:
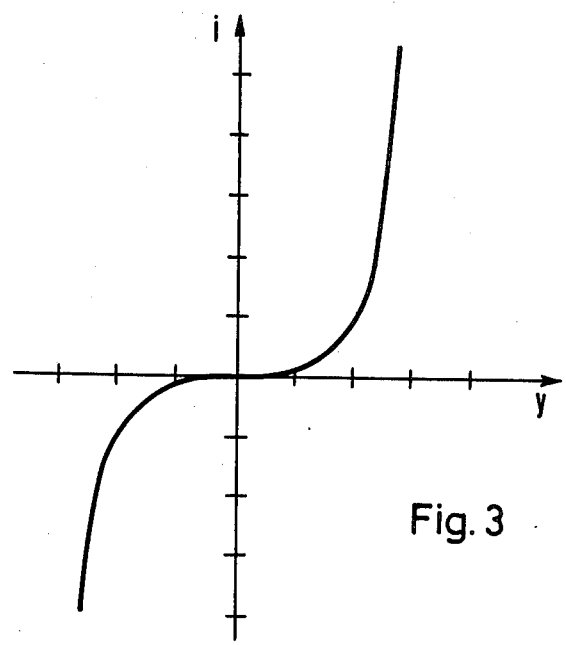
FIg. 3 illustrates the functional relationship between the input variable $y$ and the output variable $i$ of the converter of FIG. 2.

FIG. 2 illustrates an embodiment of the present invention tailored for the armature current control of a d-c motor supplied by a line commutated converter. The d-c motor 1 has a field winding 2 which is excited by a constant d-c current. the converter arrangement 3 has a six-pulse bridge circuit for each direction of the armature current $I_4$. The controlled rectifiers of the bride circuits are fired by a control unit 4 in the required order in a well known manner at the firing instant prescribed by the control variable $y$. A dead time which is dependent on the number of phases of the converter is typical for the converter 3. As is well known, the converter is controlled by shifting the firing pulses in such a manner that it can follow the change of the control signal $y$ only when the next firing takes place. In the embodiment of FIg. 2 for three phase operation the dead time of the converter is obtained, with 50 Hz, as $1/50 \cdot 6 \text{ sec} = 0.0033$ sec. For small changes this is the time which can pass before a change of the input variable of the control unit is converted into a corresponding effective change of the firing angle. The relationship shown by FIG. 3 exists between the input variable $y$ and the output variable $i$, which is obtained, for instance, by means of a d-c transformer arranged in the armature circuit. This relationship is described in a rather good approximation by the equation $i = h \cdot y^3$, where, $h$ is a proportionality constant. If, for instance, the constant gain between the reference value signal $i^*$ and the controlled variable $i$ is chosen as $V_r = 1$ in the illustrated embodiment then the function $b = \sqrt[3]{i^*/h}$ must be implemented between the output variable $b$ and the input variable $i^*$ of the compensating means 33. This constitutes the inverse of the function shown in FIG. 3. The output signal $b$ at the terminal 7 of the compensating means 33 is fed to a summing means 8 which also has as an input the output signal of a proportional integral controller 35. An analog divider is used as the modulation means 41 for the input signal of the controller 35 in the embodiment of FIG. 2. The divisor input of divider 41 is connected to the output terminal 9 of the compensating means 33. The voltage appearing at this terminal corresponds to the reciprocal of the respective proportional amplification $V_k = db/di = 1/(3 \cdot \sqrt[3]{h \cdot i^{*2}})$ of the compensating means 33. The dividend input of the modulation means 33 is connected to the output of summing junction 11, which forms the difference between the actual value of the controlled variable $i$ and the output signal $i^{*'}$ of the dead time simulator 37.

The arrangement of FIG. 2 as described so far corresponds to the arrangement according to FIG. 1. However, since the controlled system 31 in the embodiment of FIG. 2 also has delay caused by the armature circuit time contant $T_A$, additional measures are provided for its compensation. Instead of the conventional method for compensating a delay member by means of a proportional differential member, the control voltage $y$ is increased or decreased after a jump in the reference value, depending on the direction of the reference value jump, by a constant amount depending on the magnitude of the reference value step for the duration of the dead time. The effect of this derivative influence therefore cannot dissipate during the dead time without effect as with a conventional proportional differential member, but remains during the entire duration of the dead time. In the embodiment of FIG. 2, this function is implemented by comparing the output and input signal of the dead time member 37 at a summing junction 12 and feeding the difference through a proportional member 13 with adjustable gain e.g. an adjustable gain amplifier, to the summing junction 8. The gain of the proportional member 13 is adjusted according to the armature circuit time constant. In this manner the control voltage $y$ is varied proportionally to the step height and to the time constant of the delay means 37.

With the arrangement shown in FIG. 2 the response times of circuit control systems with converter control elements can be shortened many times as compared to circuits used heretofore. It has been found in this connection that the absence of the system delay in the break zone has no adverse effect on the control loop and no changes need therefore be made in its structure.

Figure 4:
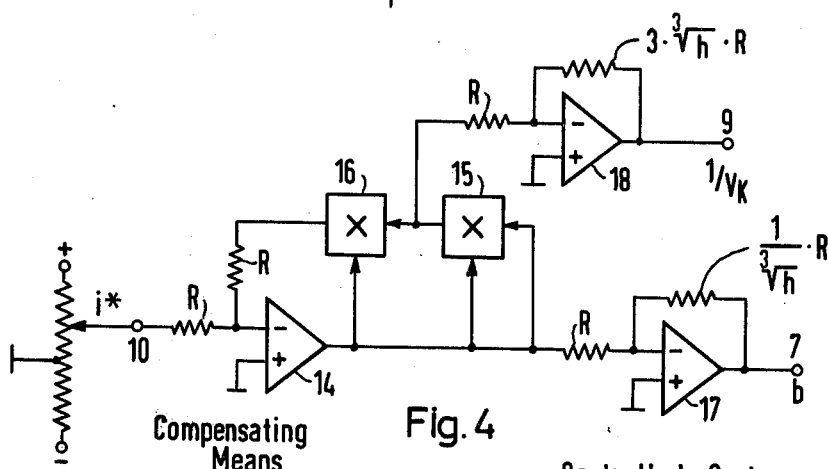
FIG. 4 is a circuit diagram illustrating the manner in which the necessary functions required in FIG. 2 can be obtained.

Each of the voltages taken off at the terminals 7 and 9 of the compensating means 33 must be in an appropriate functional relationship to the prevailing reference value signal $i^*$, which depends on the system characteristic $i = f_s(y)$. Instead of using two separate function generators for generating these two different functions, an embodiment in which both of these functions can be generated with a single function generator, making multiple use of its components is illustrated in FIG. 4. This embodiment consists of an operational amplifier 14, whose output is fed back through two series connected multipliers 15 and 16, which are driven by its output. The value of the output signal of the operational amplifier 14 is multiplied in a further operational amplifier 17 by the indicated ratio of the feedback resistance to the input resistance, i.e. by the factor $1/3 \, h$, so that the signal $b = \sqrt[3]{i^*/h}$ is produced at the output terminal 7. A further operational amplifier 18 is provided which multiplies the output signal of the multiplier 15 by the factor $3 \cdot \sqrt[3]{h}$, so that a signal of the magnitude $1/V_k = 3 \cdot \sqrt[3]{h \cdot i^{*2}}$ appears at the terminal 9 and is fed to the divisor input of the modulation means 41 of FIG. 2.

Figure 5:
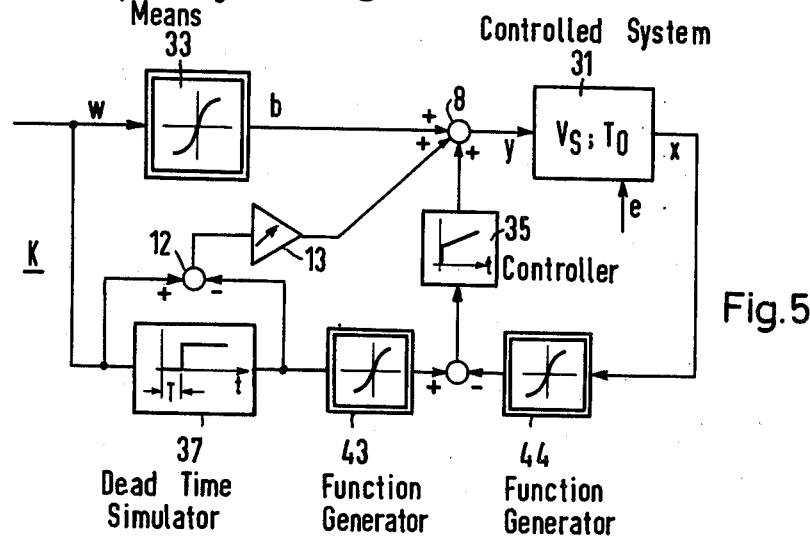
FIG. 5 is a block diagram of an alternate embodiment of the present invention.

Instead of linearizing the control circuit containing the controller by means of a modulation means in the form of a multiplier or a divider the embodiment according to FIG. 5 may also be used. In contrast to the embodiment according to FIG. 1, the reference value signal at the output of the dead time member 37 for the controller 35 is coupled through a function generator 43 and the actual value signal $x$ through a further function generator 44. The characteristics of the function generators 43 and 44 agree with that of the function generator 33, i.e. the compensating means which acts directly on the control element, and represent the inverse functions of the system characteristic $x = f_s(y)$. Through the use of the function generators 43 and 44 the control becomes linear. The embodiment according to FIG. 5 is distinguished by the use of simpler components, but care must be taken that the characteristics of the three function generators 33, 43, and 44 agree as closely as possible.

What is claimed is:

1. In an apparatus for controlling a controlled system, including a final control element with dead time, said apparatus including a controller with an integral characteristic, the improvement comprising:
   a. means generating a reference value;
   b. a dead time simulator, the dead time of which corresponds approximately to the dead time of the controlled system, having as in input said reference value and providing an output;
   c. means associated with said control system providing as an output an actual value of the controlled system;
   d. first summing means having as inputs the output of said dead time simulator and said actual value, the output of said summing means being coupled as an input to the controller with an integral characteristic whereby said controller will be supplied with a signal dependent upon the difference between the output signal of the dead time simulator and the actual value signal at its input, the output of said controller being coupled as an input to the final control element of said controlled system.
   e. means coupling said reference value in a bypass path around said dead time simulator and controller so that it forms a further input to the final control element of the controlled system.

2. Apparatus according to claim 1 wherein the controlled system has a gain that is a function of the operating point, and wherein said means coupling the reference value signal to the final control element is a compensating means having a characteristic which compensates for a change in the operating point.

3. Apparatus according to claim 2, and further including modulation means for adapting the gain of the controller to the controlled system gain.

4. Apparatus according to the claim 3 wherein the controlled system contains a delay member and further including means for coupling a quantity proportional to the difference between the output and the input signal of said dead time simulator to the input of the final control element as an additional control variable.

5. Apparatus according to claim 4, and further including first and second further compensating means interposed respectively to between the reference signal and the actual value signal and said first summing means.

6. Apparatus according to claim 4 wherein said controlled system is a control drive with a line-commutated converter as its final control element and wherein said compensating means includes:
   a. an amplifier with high no-load gain having as an input a predetermined current reference value from said means generating a reference value; and
   b. two multipliers which are arranged in series in the negative feedback path of said amplifier, and wherein said modulation means comprise:
   c. a divider obtaining a divisor input from the junction point of said multipliers.

7. Apparatus according to claim 6 wherein the output of said compensating means is coupled through a first scaling amplifier and said divisor input through a second scaling amplifier.

* * * * *